B. A. ADLER.
DIFFERENTIAL DRIVE MECHANISM.
APPLICATION FILED DEC. 18, 1916.
1,290,031.
Patented Jan. 7, 1919.
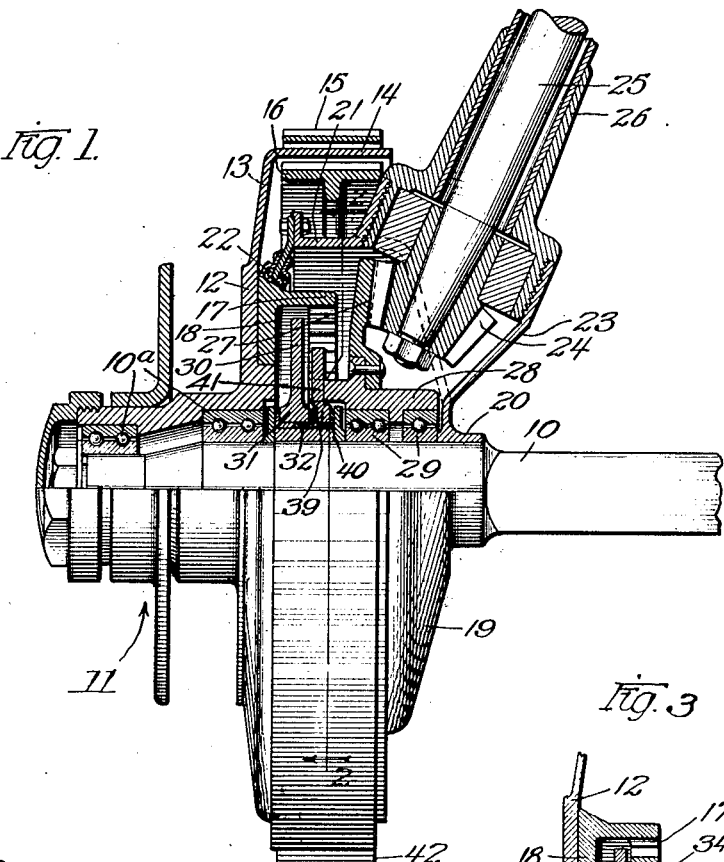
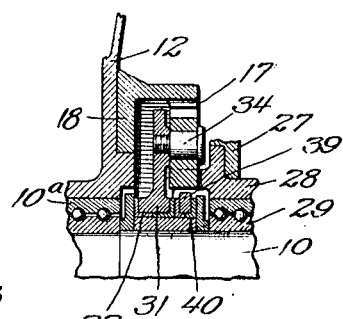
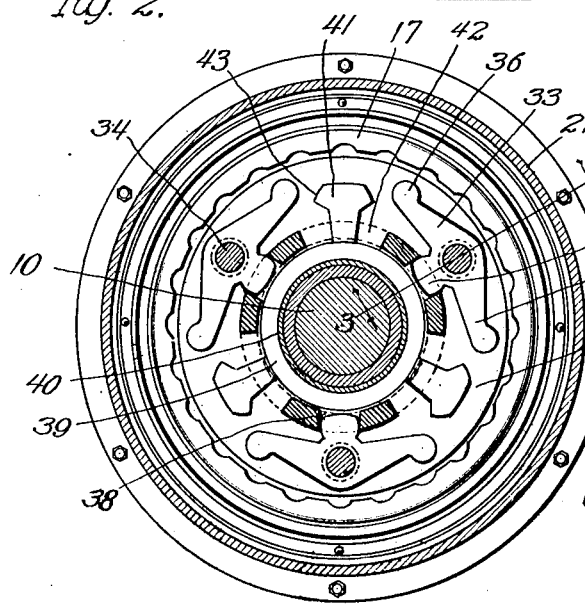
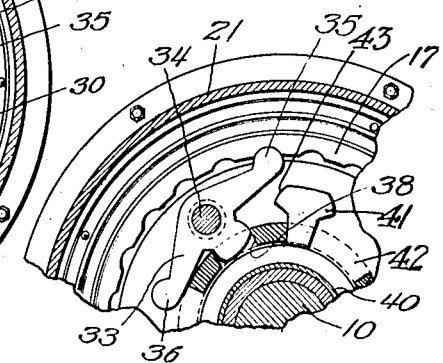

UNITED STATES PATENT OFFICE.

BROR A. ADLER, OF CHICAGO, ILLINOIS, ASSIGNOR TO ADLER MANUFACTURING COMPANY, OF WILMINGTON, DELAWARE, A CORPORATION OF DELAWARE.

DIFFERENTIAL DRIVE MECHANISM.

1,290,031.   Specification of Letters Patent.   Patented Jan. 7, 1919.

Application filed December 18, 1916. Serial No. 137,500.

*To all whom it may concern:*

Be it known that I, BROR A. ADLER, a subject of the King of Sweden, residing at Chicago, in the county of Cook and State of Illinois, have invented certain new and useful Improvements in Differential Drive Mechanism, of which the following is a specification.

This invention relates to improvements in differential gearing and more particularly to an improvement in differential gearing of pawl and ratchet wheel type, such for example as is illustrated in my patent for improvement in automobile driving mechanism, No. 1,218,613, issued March 6, 1917.

I have found that one difficulty experienced in the operation of the double ended pawl type of differential gearing is that when the driven member overruns the driver, as for example when a motor car turns a corner and the outer wheel rotates at a speed greater than that of its driver, there is a tendency of the internal ratchet wheel to throw the driving end of the pawl entirely out from engagement, consequently tilting the opposite end of the pawl outwardly toward the ratchet wheel. When this action is quite rapid there is a possibility of the opposite end of the pawl being thrown outwardly into actual engagement with the ratchet teeth, resulting in either the locking of the gearing or the breaking of a part.

It is with a view to eliminating such disadvantages of this type of gear that I have evolved my construction herein disclosed which serves as a safety device automatically limiting the pawl movement when it is disengaged from the ratchet wheel on the driven member overrunning the driving member.

Another object of my invention is to generally improve and strengthen, as well as increase the efficiency of differential gearing.

Still other and further objects will become apparent to those skilled in the art from a consideration of the following description and drawings, wherein:

Figure 1 is an elevation of my improved differential gearing mounted in the hub of a motor car wheel, the upper half being shown in section.

Fig. 2 is a transverse sectional view through the wheel hub on the line 2—2 of Fig. 1 illustrating the ratchet mechanism in neutral position.

Fig. 3 is a fragmentary sectional view on the line 3—3 of Fig. 2, and;

Fig. 4 is a fragmentary sectional view similar to Fig. 2 showing the relation of parts when in driving position.

Gearing of this general character comprises four different parts, *i. e.*, the driving member, the driven member, an intermediate member and a double ended pawl carried by the intermediate member, one or the other end of which is arranged for driving engagement with the driven member depending on the direction of rotation of the driver. When the driving member is rotated in one direction it transmits power through the pawl, tilting one end outwardly into engagement with the driven member and thus transmitting power from the driving to the driven member at the same time permitting the driven member to exceed the speed of the driver. Reversal in direction of drive tilts the opposite end of the pawl into engagement with the driven member, reversing the direction of power transmission. Differential gearing of this character is therefore capable of providing a driving connection in either direction at the same time permitting the driven member to over run the driving member when its rotary speed exceeds that of the driver. Referring to my patent, above identified, it will be evident that in the event the toothed driven annulus overruns the pawl the driving end of the pawl will be cammed out of engagement with the ratchet teeth and if this change of condition occurs rapidly, or the relative speed change is considerable, there is the possibility that the driving end of the pawl on being cammed out will flip its opposite end outwardly and into engagement with the ratchet teeth which obviously locks the mechanism and will result either in locking the gearing or the breaking of a part.

The present invention contemplates the provision of a safety device which automatically positions itself for preventing this extreme and unnecessary movement of the pawl, thus eliminating possibility of damage to the gearing and insuring its efficient action.

Referring to the drawing, wherein I have illustrated a particular embodiment of my invention, the numeral 10 indicates a stationary rear axle of a motor car on the end of which, supported on suitable annular bearings 10ª, is a wheel hub indicated in general by the numeral 11. The inner flange 12 of the hub extends radially outwardly as at 13, its outer edge portion being cupped over at 14 to provide a drum against the outer surface of which coacts the contractible brake band 15 and against the inner surface of which coacts the expansible brake band 16. The driven member of the differential gearing comprises an internally toothed annulus 17, the outer side of which is flanged, as at 18, for connection with the wheel flange 12.

A stationary cup shaped casing member 19 is provided at its center with a hub 20 for mounting upon the axle 10, its outer annular cupped flange portion 21 extending between the inner brake band 16 and the annular ratchet wheel 17. Felt packing washers 22 are secured at the inner edge of flange 21 for rubbing contact with the ring 17 to prevent grease from working out from the casing and dirt from working into the gears and bearings. A portion of the casing 19 is enlarged, as at 23 to inclose the bevel driving pinion 24 which is carried on the end of shaft 25. The shaft casing 26 is in screw threaded engagement with the internally threaded end of the casing enlargement 23. The bevel pinion 24 engages a bevel gear 27 secured upon a ring 28 which in turn is carried on annular bearings 29 supported on the axle.

The intermediate member of the transmission comprises an annular disk 30 positioned between the wheel flange 12 and the gearing 28, its inner edge being enlarged, as 31, to provide suitable bearing surface upon the bushing 32. Three double ended pawls 33 are spaced at equal distances around the ring 30 being journaled upon the pins 34 and having their opposite outer ends 35 and 36 shaped for engagement with the internal teeth on the driven annulus 17. Lugs 37 project inwardly from the middle of the pawls and engage in slots 38, cut into the inner end of the gear ring 28.

Referring to Fig. 2 it will be obvious that if the driving member, which in this instance comprises the gear 27 and its inner ring 28, is rotated in a clockwise direction the lugs 37 of the pawls will be moved in the same direction throwing the forward ends 35 of the pawls outwardly into driving engagement with the teeth of the ratchet wheel 17. A reversal in the direction of drive will disengage the pawl ends 35 and throw the ends 36 outwardly into engagement with ratchet wheel 17.

In order to limit the inward movement of either pawl end when the driven member overruns the driver, I have provided a floating ring 39 rotatable in the bushing 40 intermediate the annular ring 30 and gear ring 28 and provided with radially outwardly extending heads 41 which project through openings 42 in the gear ring 28, the opposite faces of the heads 41 being beveled off, as at 43, for coöperation with the ratchet ends 35 or 36.

The operation of the floating ring will be evident from reference to Fig. 4, in which the driver is shown as rotating in a clockwise direction, thus tilting the forward end 35 of pawl 33 outwardly into engagement with the driven annulus 17. The rear edge of slot 42 is driven forward into engagement with the rear edge of projecting head 41 positioning its rearwardly beveled face 43 directly below the pawl 35, and thus serving as a stop limiting the inward movement of the pawl in the event the driven annulus overruns the driver and thus forces the pawl out from engagement with the ratchet teeth. The head 41 is sufficiently far below pawl end 35 not to interfere with its disengagement from the ratchet teeth, but on the other hand is near enough to prevent the opposite pawl end 36 from tilting out into engagement with the ratchet wheel. On a reversal in direction of drive the opposite face of the head 41 will move into position under the end 36 of the pawl, thus serving as a stop for the pawl on its reverse movement.

In the drawing and the specification I have illustrated but a single embodiment of my invention and it is obvious that many changes of structure could be made without departing from the spirit of the invention or the scope of the appended claims.

Having described my invention, what I claim is:—

1. The combination in a differential driving mechanism of a driving member, a driven member, an intermediate member, a double ended pawl carried by the intermediate member for making connection between the driving and driven members when the driving member is rotated in either direction, one or the other end of the pawl being moved into driving engagement with the driven member depending upon the direction of rotation, and automatic means operable independently of the pawl moving means for locking the pawl against engagement of its non-driving end with the driven member.

2. The combination in a differential driving mechanism of a driving member, a driven member, an intermediate member, a double ended pawl carried by the intermediate member for making connection between the driving and driven members when the driving member is rotated in either direction, one or the other end of the pawl being moved into driving engagement with the driven member depending upon the direction of rotation, and a stop movable independently of the pawl-moving means into the path of movement of the engaged end of the pawl to prevent the engagement of the non-driving end of the pawl with the driven member except on reversal of direction of the drive.

3. The combination in a differential driving mechanism of a driving member, a driven member, an intermediate member, a double ended pawl carried by the intermediate member for making connection between the driving and driven members when the driving member is rotated in either direction, one or the other end of the pawl being moved into driving engagement with the driven member depending upon the direction of rotation, a stop automatically shiftable into a position to underlie the driving end of the pawl and prevent engagement of the non-driving end of the pawl, with the driven member except on reversal of the direction of the drive.

4. The combination in a differential driving mechanism of a driving member, a concentric internally toothed driven member, an intermediate member, double ended pawls carried by the intermediate member, means connecting the driving member and the pawls whereby rotation of the driving member in one direction moves one end of each pawl into driving engagement with the toothed member and reversal in direction of drive moves the other ends of the pawls into driving engagement with the toothed member, the toothed member at all times being free to overrun the driver in its direction of rotation, and automatic independently movable means to lock the pawls from engagement of their non-driving ends with the toothed member when the latter over-runs the driver.

5. The combination in a differential driving mechanism of a driving member, a concentric internally toothed driven member, an intermediate member, double ended pawls carried by the intermediate member, means connecting the driving member and the pawls whereby rotation of the driving member in one direction moves one end of each pawl into driving engagement with the toothed member and reversal in direction of drive moves the other ends of the pawls into driving engagement with the toothed member, the toothed member at all times being free to overrun the driver in its direction of rotation, and a plurality of stops adapted to underlie the ends of the pawls and automatically shiftable to underlie only the driving ends of the pawls thereby to lock the pawls from engagement of their non-driving ends with the toothed member when the latter overruns the driver.

6. The combination in a differential driving mechanism of a driving member, a concentric internally toothed driven member, an intermediate member, double ended pawls carried by the intermediate member, lugs extending radially inwardly from each pawl, said driving member being slotted to receive said lugs, and having other slots intermediate the lug receiving slots, a ring underlying the driving member and movable with respect thereto, heads carried by the ring and projecting radially outwardly through the intermediate slots in the driving member, said slots being of a length sufficient to permit the heads to underlie either one or the other of the adjacent ends of adjacent pawls, depending upon the direction of rotation of the driving member.

In testimony whereof I hereunto set my hand in the presence of two subscribing witnesses.

BROR A. ADLER.

In the presence of—
 STANLEY W. COOK,
 MARY Y. ALLEN.